Oct. 30, 1951 C. D. LAKE ET AL 2,573,581

STORAGE UNIT

Filed Aug. 12, 1949 6 Sheets-Sheet 1

INVENTORS
CLAIR D. LAKE
WESLEY PFAFF
DONALD R. PIATT
BY Robert S. Dunham
ATTORNEY Oct. 30, 1951 C. D. LAKE ET AL 2,573,581

STORAGE UNIT

Filed Aug. 12, 1949 6 Sheets-Sheet 2

INVENTORS
CLAIR D. LAKE
WESLEY PFAFF
DONALD R. PIATT
BY Robert S. Dunham
ATTORNEY Oct. 30, 1951 C. D. LAKE ET AL 2,573,581

STORAGE UNIT

Filed Aug. 12, 1949 6 Sheets-Sheet 3

INVENTORS
CLAIR D. LAKE
WESLEY PFAFF
DONALD R. PIATT
BY Robert S. Dunham
ATTORNEY INVENTORS
CLAIR D. LAKE
WESLEY PFAFF
DONALD R. PIATT
BY Robert S. Dunham
ATTORNEY Oct. 30, 1951 C. D. LAKE ET AL 2,573,581

STORAGE UNIT

Filed Aug. 12, 1949 6 Sheets-Sheet 5

INVENTORS
CLAIR D. LAKE
WESLEY PFAFF
DONALD R. PIATT
BY Robert S. Dunham
ATTORNEY INVENTORS
CLAIR D. LAKE
WESLEY PFAFF
DONALD R. PIATT
BY Robert S. Dunham
ATTORNEY Patented Oct. 30, 1951

2,573,581

UNITED STATES PATENT OFFICE 2,573,581

STORAGE UNIT

Clair D. Lake, Binghamton, and Wesley Pfaff and Donald R. Piatt, Endicott, N. Y., assignors to International Business Machines Corporation, New York, N. Y., a corporation of New York Application August 12, 1949, Serial No. 110,004

15 Claims. (Cl. 235—61.6)

This invention relates to storage devices and to a system for the control therof; more particularly, the invention relates to an electrical storage device for use in connection with electric accounting and computing machines, and it has particular utility in accounting and computing systems which operate under control of perforated record cards.

Information from a source such as a perforated record card may be sensed concurrently or it may be sensed column by column. Accordingly, provision should be made for either concurrent entry or column by column entry into a data storage device. Information read out from the storage device may be read out of storage by a concurrent readout or it may be read out column by column depending upon the type of device which is to receive the stored information.

Accordingly, storage devices of this class must functionally be adapted to store information and to make available such stored information in a plurality of different ways. For example, information may be entered into the storage device concurrently and read out of the device concurrently, i. e. all like digits of a given field may be entered simultaneously and later read out simultaneously; information may be entered concurrently and read out in column by column progression, i. e. all information in a single column irrespective of the value of the designations may be read out of the device at one time; information may be entered in column by column fashion and read out of the storage device in column by column fashion; and finally, information may be entered in column by column fashion and read out concurrently.

It is, therefore, the general object of this invention to provide a storage unit which is applicable to each of the four operating conditions enumerated above.

In its present embodiment the storage unit comprises essentially a plurality of storage plates, each of which includes a plurality of storage wires which are adapted to be flexed into an oblique position by operation of storage plate mechanism so that selected flexed wires thereafter may be latched into so-called stored position upon operation of reading bars which traverse the storage plates. The wires in a stored or latched position are adapted to form part of control circuits for subsequent use, which circuits are completed at predetermined times upon further operation of the reading bars of the mechanism.

Further objects, advantages and features of the storage device and the system for its control will become clear as the following specification is read in light of the drawings in which.

Figure 1:
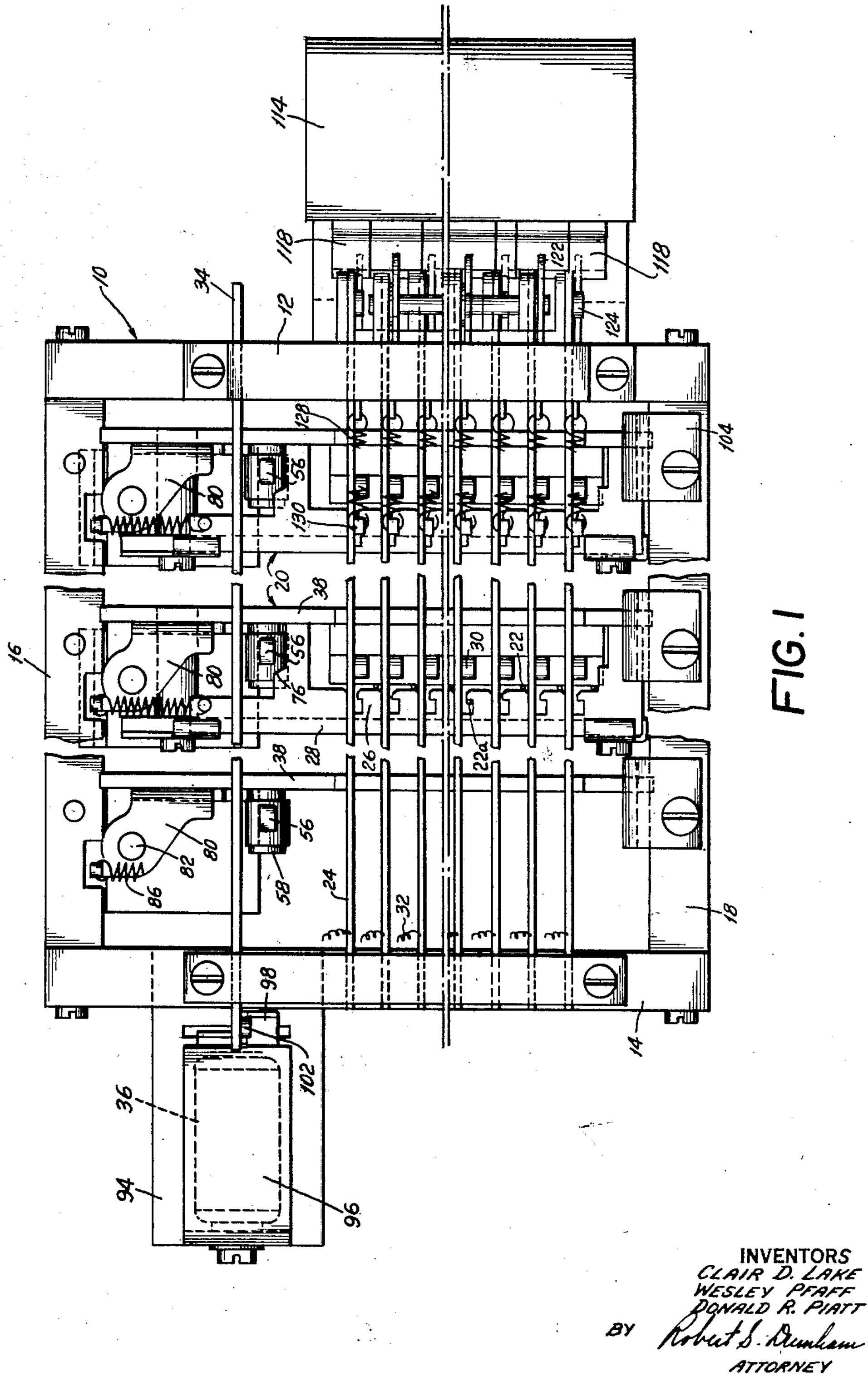
Fig. 1 is a broken plan view of the storage unit.

The storage device 10 comprises a supporting frame made up of end members 12 and 14 and side members 16 and 18. The frame members are suitably attached at their ends to form a generally rectangular supporting chassis for a plurality of storage plates 20. The size of the supporting framework is determined by the number and length of the storage plates that are assembled to constitute a storage unit.

Each plate 20 of the storage device has mounted thereon a plurality of storage wires 22 which are fixed in spaced relation along the length of the storage plate. Traversing the storage plates in perpendicular intersecting relation are a plurality of reading bars 24. Each storage plate 20 has associated therewith an actuating device which engages the storage wires 22 and flexes the upper free ends of the wires into a registering position with respect to passages formed between associated reading bars and latch heads 26 of a latching plate 28 comprising a part of the storage plate. The storage plates may be referred to as storage zones.

The reading bars 24 have formed thereon reading projections 30 which are normally spaced a short distance from the storage wires. It will be noted that in their normal position the storage wires 22 lie beyond the zone of influence of the reading projections 30, but when the wires are flexed laterally to their extreme position they are in the path of the reading projection 30, so that upon reciprocation of the reading bars the projections 30 thereon will engage wires flexed into their path and move the same beyond the latch heads 26 of the latching plates, where the wires by their natural resilience will engage behind the latch heads of the latching plate. A storage wire in latched position is shown at 22*a* in Fig. 1 of the drawing.

When wires are latched in stored position representative of either numerical or alphabetical values, they are retained in such position for subsequent readout upon reciprocation of the reading bars. In this regard it may be noted that the reading bars are adapted to be electrically energized through suitable leads 32 and that they constitute part of a control circuit which is closed upon subsequent contact between a reading projection 30 and a stored wire 22*a*. An impulse passing through the reading bar and the stored wire may be used to control the operation of electric computing and accounting machines, for example.

When it is desired to reset the storage device, all storage plates thereof may be conditioned for resetting by reciprocation of a reset bar 34 which is under the control of a resetting magnet 36.

Figure 4:
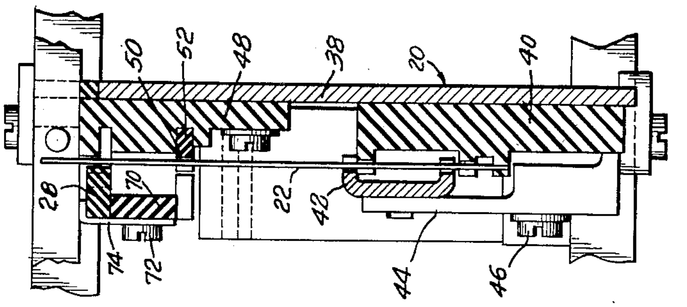
Fig. 4 is a cross-sectional view on line 4—4 of Fig. 3.
Figure 3:
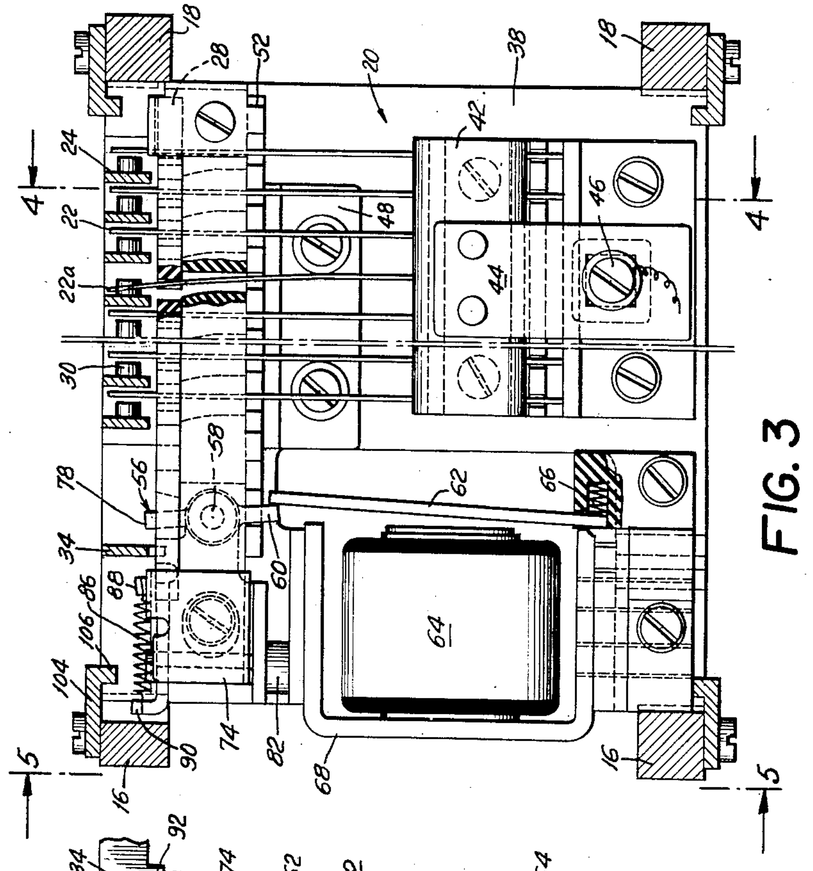
Fig. 3 is a cross-sectional view on line 3—3 of Fig. 2.
Figure 5:
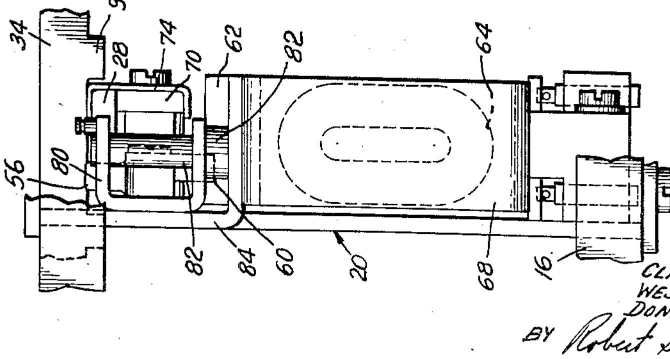
Fig. 5 is an end elevational view on line 5—5 of Fig. 3, parts being shown in full line and other parts being broken away to show underlying structure.
Figure 6:
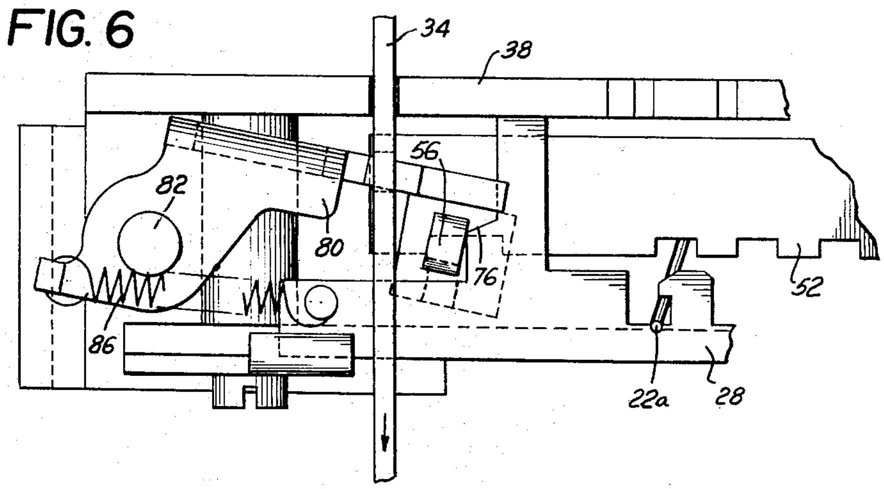
Fig. 6 is an enlarged view of reset mechanism.
Figure 7:
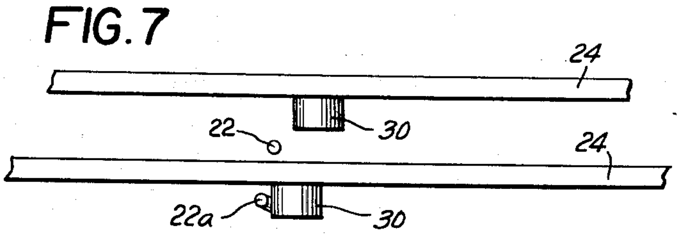
Fig. 7 is a view showing the normal position of a storage wire and an associated reading bar at the top thereof and the latched position of the storage wire in the reading position of the reading bar at the bottom thereof.

The specific nature of the several storage plates may best be understood by reference to Figs. 3, 4 and 5. Each storage plate comprises a base 38 to which is attached an insulating block 40 for the support of one end of the storage wires 22. The block 40 has a plurality of notched flanges extending from the open face thereof which serve to space the wires from each other. A channel-shaped common conductor bar 42 has provided in the flanged edges thereof a series of spaced notches which correspond to the notches in the face flanges of the insulating block and each of these notches is adapted to embrace a storage wire. The common conductor bar 42 is fixed in position by means of a bracket 44 which is attached to the plate assembly, and which includes a stud 46 constituting a lead terminal.

At the upper end of the storage plate base 38 is an insulating guide block 48, which is fixed to the base. The open face of the guide block 48 has formed therein a guide channel 50 in which is mounted for reciprocating movement a storage wire comb 52. The free edge of the wire storage comb is notched to separately accommodate the storage wires 22, so that when the comb 52 is reciprocated against the storage wires passing therethrough, the wires will be flexed in a lateral direction in equally spaced relation to each other.

Mounted on a bracket 80 at one edge of the storage plate is a lever 56 having oppositely extending fingers. The lever 56 is mounted for rocking movement about a pivot pin 58 carried by the bracket 80. The downwardly extending finger 60 of the operating lever extends through a notch at the adjacent end of the storage comb 52 so that rocking movement of the lever about its pivot 58 will be effective to reciprocate the storage comb 52, thereby flexing the storage wires 22 into the path of the reading bar projection 30 for the subsequent storing of selected wires. The downwardly projecting finger 60 of the operating lever 56 is adapted for operation by the armature 62 of an electromagnet 64. The armature 62 is pivoted at one end where it is spring-biased away from the core of the electromagnet by means of a spring 66. The opposite free end of the armature lies in contact with the downwardly projecting finger 60 of the operating lever. It will follow, therefore, that when the electromagnet 64 is energized, the armature 62 will be attracted thereto and swing the lever 56 about its pivot point 58 in a clockwise direction. This will result in the flexing of the storage wires as the storage comb 52 is reciprocated toward the left as viewed in Fig. 3 of the drawings. The electromagnet 64 is carried by a U-shaped bracket 68 which is mounted on the storage plate.

When any of the wires of a storage plate have been latched in stored position, they will remain in that position for repeated readout until the latch plate 28 is reciprocated into wire releasing position. The latch plate 28 is supported for sliding movement on a guide block 70 attached to the base of the plate by means of screws 72 and the plate is retained in position with reference to the guide block by means of brackets 74. One end of the latch plate is recessed to provide a shoulder 76 behind which the upwardly extending finger 78 of the pivoted operating lever 56 may engage for reciprocating the latch plate into stored wire releasing position.

The pivot stud 58 of the operating lever 56 is mounted on the U-shaped bracket 80 which in turn is mounted for swinging movement in a horizontal plane about a stud 82 extending upwardly from a frame bracket 84. The U-shaped bracket 80 is normally held in its counter-clockwise limit of rotation as viewed in Fig. 1 and the latching bar 28 is normally held to the left in Fig. 3 by means of a spring 86 which has one end thereof fixed to an attaching stud 88 extending upwardly from the latching bar and the other end thereof to an attaching ear 90 extending upwardly from the pivoted bracket. The point at which the spring is attached to the bracket is eccentric with respect to the axis of the U-shaped bracket with the result that normal spring tension tends to move the bracket in a counter-clockwise direction, thus retaining the same in the normal position in which the downwardly extending finger 60 engages the wire flexing comb 52.

The reset bar 34 is mounted for reciprocating movement in aligned slots opening through the upper edge of the several storage plates. The reset bar is moved under the influence of the reset magnet 36. The reset bar has downwardly projecting lugs 92 which are adapted to engage the U-shaped pivoted bracket 80 when the reset bar is reciprocated, and through such engagement rotate the bracket about its pivot stud 82. When the bracket is pivoted in a horizontal plane, the upwardly extending finger 78 of the operating lever 56 is disengaged from the wire storage comb 52, and the upwardly extending finger 78 thereof is engaged with the shoulder 76 of the latching plate 28. This relationship of the parts exists when the reset magnet 36 is energized. The end frame 14 of the storage unit chassis has an extension 94 upon which is mounted a yoke 96 which supports the reset magnet 36. An armature 98 is pivoted in the lower leg of the magnet supporting yoke, and its upper free end has a fork 100 therein which engages an operating stud 102 at the end of the reset bar 34.

When the reset magnet 36 is energized the armature 98 will be attracted to the core of the magnet, thereby rocking the armature about its pivot point in the magnet yoke and swinging the upper forked end in a counter-clockwise direction, thereby conditioning the operating levers 56 of each of the storage plates to bring the downwardly projecting fingers 60 thereof into contact with their respective latch plates 28. Thereafter, as each storage plate magnet is energized, the armature 62 thereof will rock the operating lever 56 about its axis, and thereby shift the latch plate 28 to the right as viewed in Fig. 3, thus releasing any wires that may have been latched in stored position.

It is evident from the foregoing that each storage plate is in effect a self-contained unit adapted for assembly into a storage device of any required capacity. To facilitate the assembly, the side frame members 16 and 18 of the unit have oppositely disposed grooves formed therein for the reception and positioning of the storage plates in spaced relation to each other in the assembly. Each of the frame members 16 and 18 has a flanged locking plate 104 attached thereto, a flange 106 of which extends inwardly into a notch of the storage plate. The storage plates are thereby securely held against movement relative to the supporting frame in all directions.

The reading bars 24 are guided for reciprocating movement under the influence of reading bar magnets 108, the movement being in parallel planes corresponding to the aligned positions of storage wires of the several storage plates. The reading bars are guided for reciprocating movement through notches in the top edges of the storage plates, and the end plates 12 and 14 of the unit frame. The end frame 12 of the unit has an upwardly extending portion 110, and it includes an outwardly extending mounting bracket 112. The mounting bracket 112 is adapted to support a series of reading bar magnets 108 which are arranged in superimposed relation in a U-shaped mounting yoke 114. This expedient permits the mounting of a greater number of magnets in a given space across the width of the frame with the consequence that the reading bars may be located closer to each other. The U-shaped mounting yoke has attached thereto between each pair of magnets a forked frame 116 on which the armatures 118 of the magnets are pivoted for rocking movement into contact with the magnet core or away from the same when the magnet is deenergized.

Figure 2:
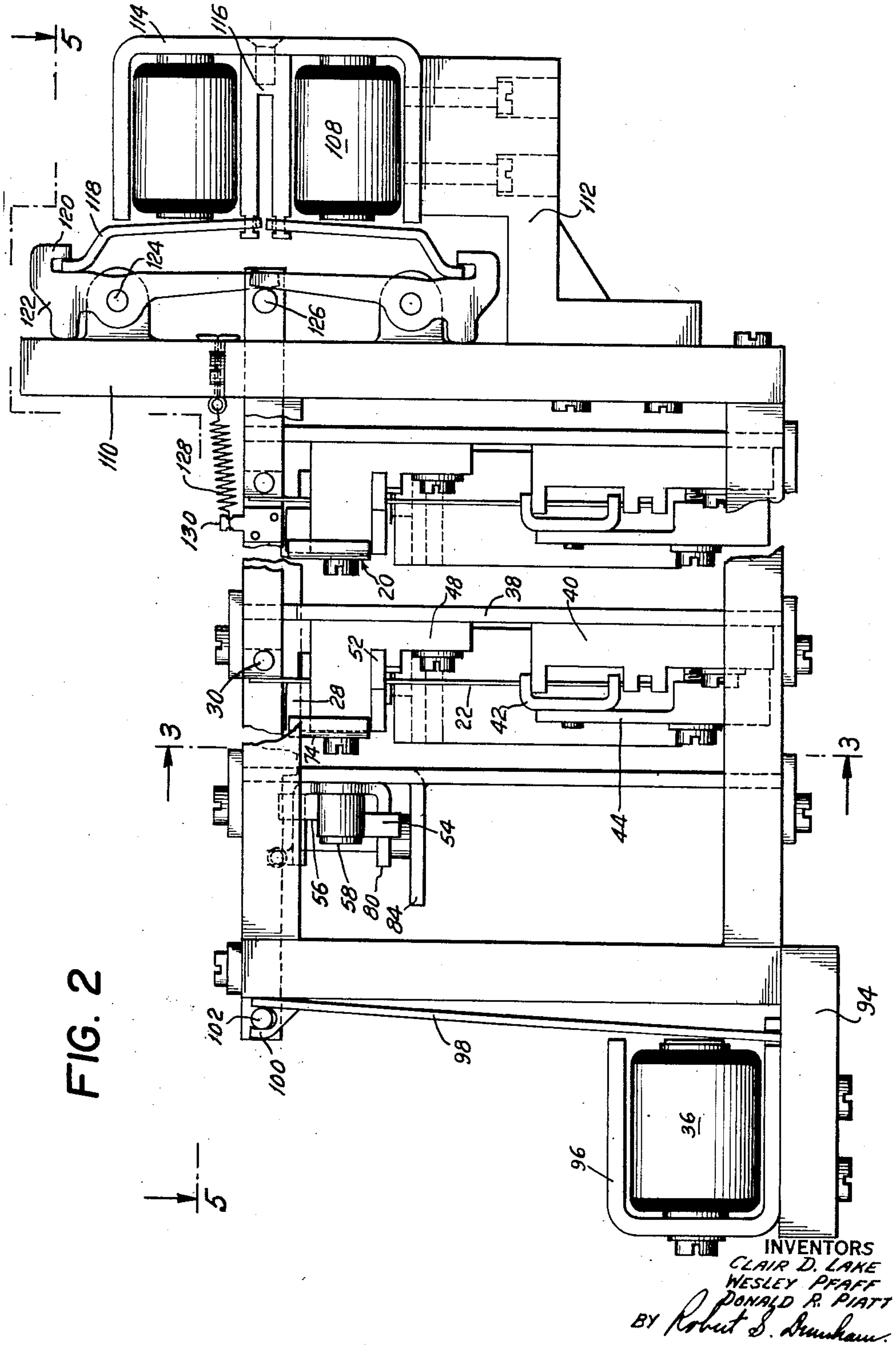
Fig. 2 is a broken elevational view.

The oppositely extending free ends of the armatures engage the hooked ends 120 of reading bar operating levers 122 so that the upper operating levers will be rocked in a clockwise direction and the lower operating levers will be rocked in a counter-clockwise direction about pivots 124 when the armatures 118 are attracted to the core of their respective magnets. The free ends of the operating levers are adapted to abut laterally projecting studs 126 on their associated reading bars and move such bars to the left as viewed in Figs. 1 and 2. The movement of each bar is sufficient to bring the reading projection 30 into contact with the storage wires 22 either for latching such wires in stored position or for readout contact with wires that are latched in stored position. The reading bars are retracted to their normal position by springs 128 which are anchored at one end of the upstanding frame member 110 and at the other end of an upstanding reading bar lug 130.

The more particular function of the storage unit will apear clearly from the following description of its operation in connection with the circuit diagrams. It is sufficient to say that in whatever environment the device is oriented, it is essential that in the latching of wires in stored position the storage plate magnets 64 be energized prior to the time the reading bar magnets 108 are energized. It may also be pertinent to note that both the storage plate magnets and the reading bar magnets may be energized either successively or selectively in such manner that the reading bar magnets come into operation following the operation of the storage plate magnets.

*Circuit description*

Figure 8:
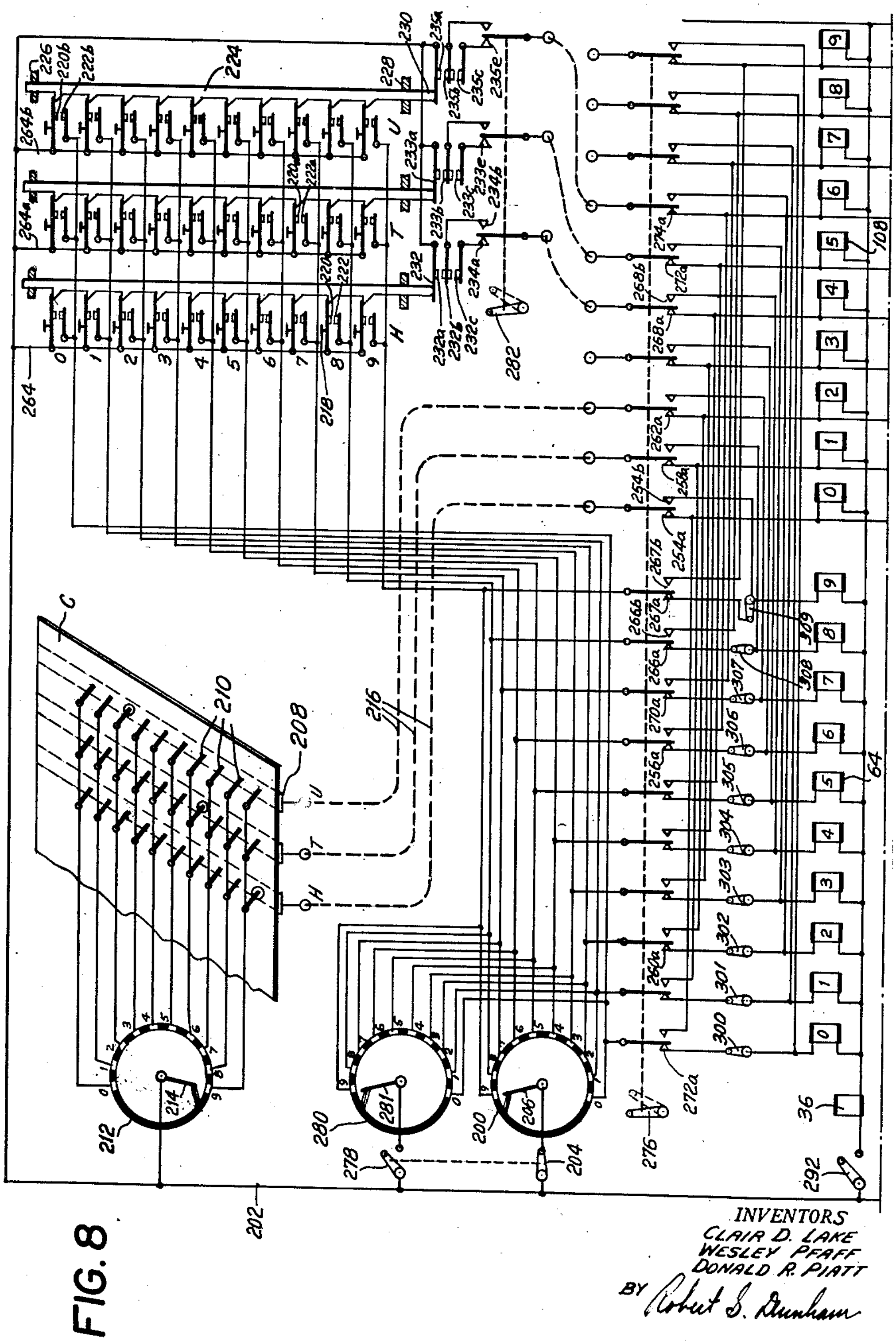
Figs. 8 and 9 together constitute a diagram of the storage device in an operative environment.
Figure 9:
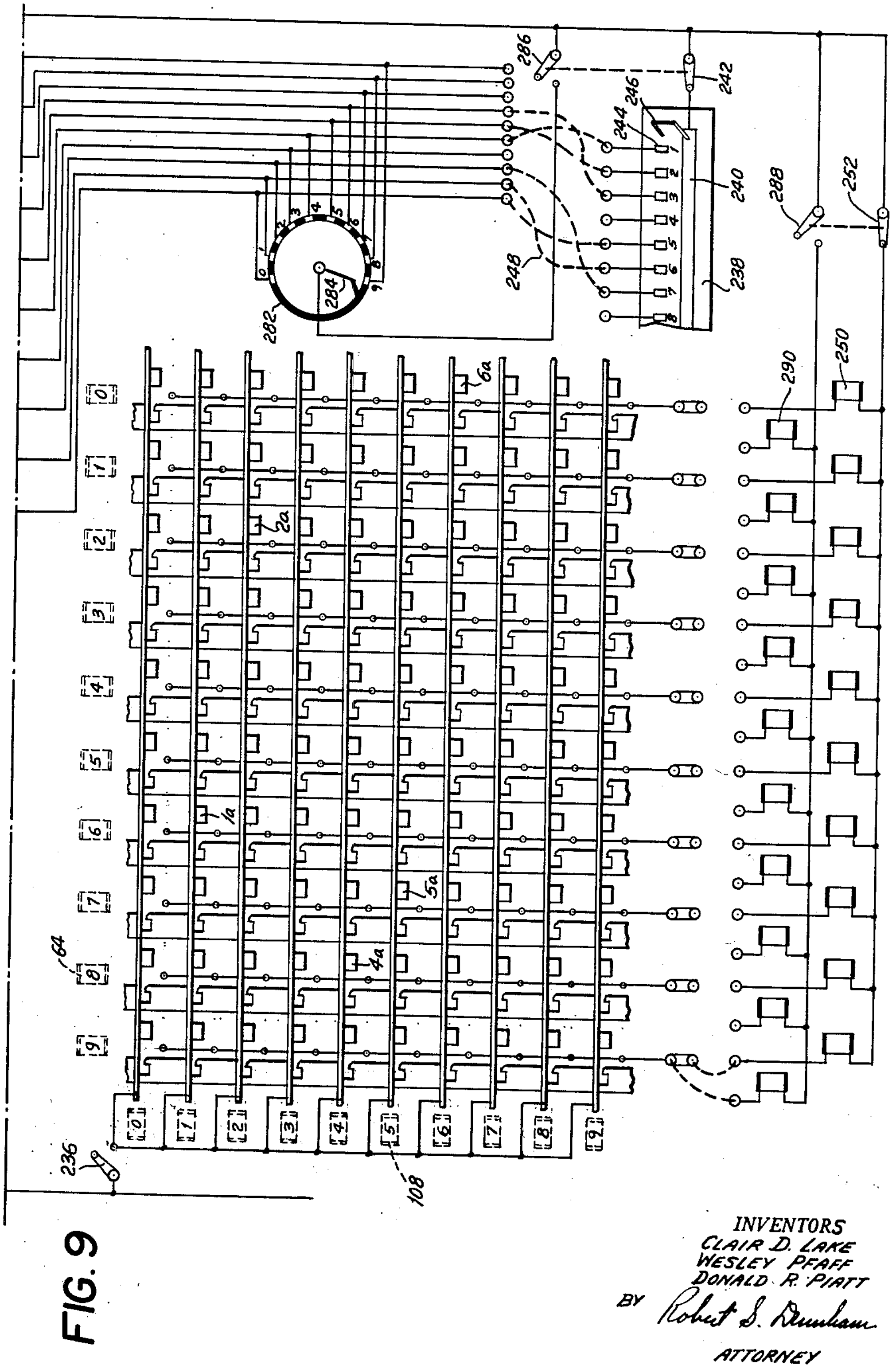

The normal condition of the circuit shown in Figs. 8 and 9 of the drawings orients the storage device for column by column readout as required by some record controlled machines, as for example, perforated card controlled punching mechanism of the step-by-step or column-by-column type. The entries of data into the storage device may be either concurrent or column by column or by both methods.

The storage plate magnets are connected with an impulse emitter 200 which is energized from a source of power 202 through a line switch 204. The emitter 200 has a plurality of spaced contact points which are swept in serial order by rotating brush 206 which may be driven in any suitable manner.

Herein the contact points of the emitter are ten in number, representing the values 1 through 9 and zero. As the brush 206 of the emitter rotates, an impulse is impressed on the storage plate magnets 1 through 9 and zero, thereby successively energizing the magnets and thereby drawing the storage wires of their associated storage plates into latching position.

Whether or not a wire will be latched in storage position will be determined by the presence or absence of a perforation or perforations in the field of a perforated record card C which is herein represented as being statically read in a well known manner. The sensing device includes a sensing station provided with a plurality of conducting strips 208, which correspond to the columns of a card being read. Herein the field being sensed is composed of three columns representing units, tens and hundreds. It will be understood that each column consists of a plurality of index point positions which are herein illustrated as being ten in number representing the digits 1 through 9 zero. The sensing mechanism includes a series of brushes or pins 210 corresponding in number and position to the index point positions of the field being scanned. A sensing impulse impressed on the sensing brushes supplies current to the brushes corresponding to digit positions so that the entry from the record is made concurrently, i. e. all digits of a kind are read and stored simultaneously. Particularly, it will be noted that the emitter 212 has a plurality of spaced and mutually insulated contact points representing the digits 1 through 9 and zero, and each of these points is connected through its associated set of brushes and then through the corresponding index point position of the card. Consequently, when current from the line 202 is impressed on any one of the contact points of the emitter by rotation of the brush 214 into contact therewith, a sensing impulse is impressed on the brushes of that particular group. If an index point has been perforated in any one of the columns, a circuit will be established through the brush 210, through the contact plate 208 and into the conductors 216 which connect the contact plates 208 with the respective reading bar magnets 108. Consequently, as perforations are sensed by the sensing device, corresponding magnets of the reading bar assembled are energized, thereby reciprocating the reading bars and latching any wire or wires which may have been pulled across the path of such reading bars by the previous energization of storage plate magnets.

It follows from the foregoing, therefore, that a definite timing relationship must exist between the emitter 200 and the emitter 212. In operation the emitter 200 must lead the emitter 212, thereby assuring that the storage wires are flexed into position to be stored before the associated reading bars are reciprocated to effect the storage of such wires.

As hereinabove indicated, the storage device is adapted to receive data for column by column readout from either a concurrent entry source or from a column by column entry device. Thus, a column by column entry may be achieved for column by column readout in accordance with the normal circuit shown in the diagram. Therein a keyboard is employed having three banks of keys representing units, tens and hundreds, each bank having ten keys herein designating, for purposes of illustration, the digits 1 through 9 and zero. Each key 218 includes a contact point 220 which is adapted to complete a circuit when depressed through a fixed contact point 222. The key contact 220 is in the power line circuit through connector 264, whereas the fixed contacts 222 are electrically connected to their respective storage plate magnets 64. Thus, upon depression of any one of the keys 218, a circuit is established from one side of the line through the closed contacts of the key and to the storage plate magnet controlled thereby. Consequently, upon closure of any given key, its related storage plate magnet is energized and the storage wires in the associated plate are brought into position where they may be latched for storage purposes.

The latching of the positioned storage wires is accomplished by energizing the reading bar magnets through operation of common key bail 224, one of which being provided for each bank of keys. Key bails 224 are mounted for sliding movement in suitable guide journals 226 and 228, and each bail has a projection positioned with reference to the keys of its bank so that depression of any key of the bank, and closure of the contacts thereof, will serve to reciprocate the common bail. The bails include an extension 230 which lies in contact with the free end of a leaf spring contact device 232 energized by the power source. It will be seen, therefore, that as a key bail 224 is depressed to bring the contact points controlled thereby into conductive relation, a circuit will be established from the line, through the now closed contact points as mentioned, and into closed points of gang switches 234, and from thence to the reading bar magnets 108, thereby operating the reading bars. This will result in the reciprocation of the corresponding reading bars and the consequent latching of any storage wires that may have been flexed into the path of the reading bars by the previous operation of storage plate magnets.

Here again it is essential to note that a definite time relation exists between the closure of the key contacts 220 and 222 and the bail contacts 232*a*, 232*b* and 232*c*. It is essential that the key contacts close at least momentarily before the bail contacts are closed. This insures the positioning of the storage plate wires in the path of the reading bars prior to the operation of the reading bars, and thereby insures that the intended wires are latched.

With designated data entered into the storage unit, either by concurrent entry or column by column entry, such data may be read out of the storage device in column by column manner, substantially as follows: A readout switch 236 is closed and such closure is effective to connect the reading bars to the power source. It may be assumed herein that the stored data is to be read out for the column by column operation of control magnets as provided in well known column by column types of electric punching machines. Such machines include a strip commutator 238 having a common contact strip 240 connected through a switch 242 to one side of the power line. Such commutators also have spaced mutually insulated contact points 244 which are successively bridged by a bridging brush 246. Herein the digit positions of the punching device are connected by plug wires 248 to selected reading bar magnet plug sockets. For the purpose of readout the bridge contact 246 is stepped along the strip commutator to successively bridge the contact points 244 and the common strip contact 240, thereby successively impressing a reading impulse on the reading bar magnets 108 in all those positions that are plug connected. As the reading bar magnets are reciprocated, the contact projection thereon will make an electrical contact with any wire that may have been latched in storage position. When such contact is made, an impulse will pass from the power source through the reading bar, its projection in contact with a stored wire, through the storage wire to the connected control magnets 250, which control punching mechanism, in a well known manner. The return to the opposite side of the line is through a closed line switch 252.

Let it be assumed, for example, that the sum 962 is to be entered concurrently from a perforated record card and the sum 870 is to be entered column by column from a keyboard. In this event, the circuit will be disposed as shown in the diagram. A card C having a perforation at the 9 index point of the hundreds column, a perforation at the 6 index point of the tens column and a perforation at the 2 index point of the units column will provide the control data. When the brush 206 of the emitter 200 contacts the segment representative of the digit 9 in control of the 9 storage plate magnet, that magnet will be energized and deflect the storage wires in its associated plate into position for latching. Immediately thereafter the brush 214 of the emitter 212 will come into contact with the 9 segment, which will impress a sensing impulse on all 9 digital index point positions of the record card. Since a perforation appears at the 9 position of the hundreds column, an impulse will be impressed through the connecting conductor 216, through the closed switch point 254*a*, and thence to the zero reading bar magnet. This will result in the reciprocation of the zero reading bar, which will latch the 9 storage wire. As the brush 206 continues to sweep about the contact segments, it will contact the 6 segment, thereby energizing the lead thereof and transmitting an impulse through the closed contact 256*a*, energizing the storage plate magnet representative of the 6 value. Soon thereafter the brush 214 of the emitter 212 will contact the perforation at the 6 index point position of the tens column in the card C, thereby energizing the one reading bar magnet through the connector 216 and the closed switch contact 258a. Operation of the one reading bar magnet will reciprocate the corresponding reading bar and latch the storage wire which has been flexed into the path of its projection by operation of the 6 storage plate magnet. To continue, the brush 206 will directly contact the 2 contact point of the emitter 200, thereby energizing the 2 storage plate magnet by way of the interconnecting conductor and the closed switch point 260a. This will result in the operation of the 2 storage plate magnet and the flexing of the storage wires associated therewith so that they will stand in position for latching in stored condition upon reciprocation of any selected reading bar magnet. This latter follows, of course, when the brush 214 of the emitter 212 comes into contact with the 2 segment, thereby sensing the perforation in the 2 index point position of the units column of the record card. A circuit will thereby be established through the underlying contact bar 208, the units conductor 216, and the closed switch points 262a, to the 2 reading bar magnet. When the 2 reading bar magnet is energized, its associated reading bar will be reciprocated to latch the wire under its influence which has been flexed by the 2 storage plate magnet. Thus, wires representative of the sum 962 are latched in stored position for subsequent column by column readout.

In column by column entry from the keyboard, the 8 key of the hundreds column is depressed, thereby closing its contact points 220 and 222 for establishing a circuit from the line 202, through the common lead 264, the key contact points 220 and 222, the associated conductor through the closed switch point 266a, to energize the 8 storage plate magnet. Following in close sequence thereafter will be the closure of the bail contacts 232a, 232b and 232c, which establishes a circuit from the line through the closed bail contacts, the closed switch contact 234a, the closed switch contact 268a and the 4 reading bar magnet. This will result in the reciprocation of the reading bar associated with the 4 magnet, with the consequent latching of the 8 wire. Depression of the 7 key of the tens bank will establish a circuit from the line 202 through the common conductor 264a, through the contacts 220a and 222a, through closed switch contact 270a and the 7 storage plate magnet, thereby deflecting the wires of the 7 storage plate into latching position. Following the closure of the 7 key, the tens bank bail will be operative to close switch points 233a, 233b and 233c, to establish a circuit through closed switch contact 233e, the plug connection, closed switch contact 272a and the 5 reading bar magnet, thus reciprocating the 5 reading bar and latching the 7 storage wire which has been moved into latching position by the 7 storage plate magnet.

Depression of the zero key of the units bank will establish a circuit from the line 202 through the common conductor 264b, the key contact points 220b and 222b, through the connector, the closed switch 272a and the zero storage plate magnet, thus flexing the storage wires of that plate into latching position. Depression of the bail in the units position will thereafter close bail contacts 235a, 235b and 235c, thereby supplying line current through the closed switch point 235e, the plug wire, through the closed switch contact 274a and the 6 reading bar magnet, thereby reciprocating the associated reading bar and latching the zero wire in stored position. Thus, wires representative of the sum 870 are latched in stored position for subsequent column by column readout.

The method of entry hereinbefore described will result in storing all like digits columnwise in a single storage plate, with other digits stored in their respective columns in the storage device. Data from a particular entry column and representative of different digits will be stored along the length of the reading bars. For example, 9 may be stored at the extreme left, 8 at the next position to the right along the length of the reading bar, etc. It follows, therefore, that as the reading bars are reciprocated successively for readout operations, the latched wires will be sensed in column by column relation.

As mentioned hereinabove, it may be desired to energize punch control magnets through the latched wires in the storage device, and the method for achieving this result has been only generally described. Specifically, therefore, as the bridging contact 246 is moved step by step in a right to left direction as viewed in the diagram, operating impulses will be impressed successively on the reading bar magnets. Thus, when the brush 246 comes in contact with the first contact of the strip commutator 238, an impulse will be transmitted through the plug connection and into the circuit controlling the 4 reading bar magnet to which the plug wire is connected. As the magnet moves the reading bar into contact with the wire representing an 8, a circuit will be established from the line, through the now closed readout switch 236, the 4 reading bar, the projection 4a thereof, the latched wire, and through the wire to the punch magnet controlling the punch for the 8 index position. A perforation will, therefore, be punched in the 8 index position of the hundreds column. As the brush 246 bridges the second contact point of the readout commutator, a circuit will be established from the line, through the switch 242, the common contact of the commutator, the bridging brush, the second contact point of the commutator, the plug wire and the circuit controlling the 5 readout magnet. This will result in the reciprocation of the 5 readout bar and contact between the projection 5a thereon and the latched wire representing a 7, thereby establishing a circuit from the line, through the now closed readout switch 236, the 5 readout bar, the latched wire and the magnet controlling the punch for the 7 index position. A hole will, therefore, be punched in the 7 index point position of the tens column of the card. It might be added here that the card is moved under the punches controlled by the punching magnets in step-by-step progression, which is synchronized with the step-by-step movement of the bridging contact brush 246 in well known manner.

As the contact brush 246 comes into contact with the third contact point of the commutator 238, a circuit is established from the line, through switch 242, the commutator common 240, the brush 246, the third contact point of the commutator, the plug wires, and into the line controlling the 6 reading bar magnet. As the 6 reading bar magnet is reciprocated, its projection 6a will contact the latched zero wire, thereby establishing a circuit from the line through the now closed readout switch 236, the 6 readout bar, the stored zero wire and the punch control magnet for the zero index point of a card. This will result in the punching of the zero index point position of a card in the units column.

The brush 246 will pass over the fourth contact point of the commutator without effecting the mechanism, since this point is not connected to the control circuit. However, as the brush moves into contact with the fifth contact point of the commutator, a circuit is established from the line, through the closed switch 242, the common 240 of the commutator, the brush 246, the fifth contact point of the commutator, the plug wire leading to the zero reading bar magnet. This results in a reciprocation of the zero reading bar and the closure of a circuit between the stored 9 wire and the adjacent reading bar projection, thereby establishing a circuit from the line, through the now closed readout switch 236, the zero reading bar, the 9 wire and the punch control magnet corresponding to the 9 index point position of a card. This results in the punching of a hole at the 9 index point position of a card in the hundreds column of the second statistical field.

As the brush 246 comes in contact with the sixth contact point of the commutator 238, a circuit is established from the line through the switch 242, commutator common 240, bridging brush 246, contact point 6, the plug wire and the circuit controlling the 1 (one) reading bar magnet. This results in reciprocation of the 1 reading bar and the making of a contact between the projection 1a of the reading bar and the latched 6 wire adjacent thereto. A circuit is now established from the line through the now closed readout switch 236, the 1 reading bar, the latched 6 wire and the punch magnet for the 6 index point position of a card to be punched. When the 6 magnet is energized, a hole will be punched in the 6 index point position of the tens column of the second statistical field.

Finally, when the bridging brush 246 comes into contact with the seventh contact point of the commutator 238, a circuit will be established from the line, through the switch 242, commutator common 240, bridging brush 246, contact point 7, the plug wire and circuit controlling the 2 readout bar magnet. This causes the 2 readout bar to reciprocate and establish a connection between the projection 2a thereof and the latched 2 wire adjacent thereto. A circuit is thereby established from the line, through the now closed readout switch 236, the readout bar 2, the latched 2 wire and the magnet controlling the punch for the second index position of a card. As a consequence, a perforation will be punched in a card at the 2 index point position in the units column of the second statistical field.

As hereinabove indicated, the storage device is adapted for universal application, as among the several possible storage and readout conditions. The foregoing examples have been effective to demonstrate concurrent and column by column entry for column by column readout.

The modification of the system for concurrent and column by column entry adapting the same to concurrent readout will now be explained. In order to condition the storage device for concurrent readout, it is necessary that the entry be such as to store the data from any given source column in a single storage plate. It will be remembered that for column by column readout all like digits were stored in a single storage plate. There has been illustrated herein, therefore, a simple means for modifying the entry circuits to achieve the desired result. The several leads from the emitters and the entry sources have been provided with a gang switch operable by a switch actuator 276, which when thrown to the dotted line position will invert the circuits so that impulses which formerly were directed to the storage plate magnets are now directed to the reading bar magnets and impulses that were formerly directed to the reading bar magnets are now directed to the storage plate magnets. This, in effect, reverses the positional function of the reading bar magnets 108 and renders them effective to represent values while the storage plate magnets which heretofore represented values now, in effect, have a positional function. In other words, in the example presupposed by the wiring diagram, the emitter and the key contacts of the keyboard will now control the reading bar magnets while the perforations in the card and the keyboard bails will control the storage plate magnets.

Since the function of the storage plate magnets and the reading bar magnets in effect has been reversed, it becomes necessary to change the time relationship in which these respective sets of magnets are energized. This change is brought about, insofar as concurrent entry from a card may be concerned, by opening emitter switch 204 and closing switch 278, which is in the line of a second emitter 280. The emitter 280 is in all respects similar to the emitter 200 with the exception that its timing is such as to lag slightly behind emitter 212. This results, therefore, in the initial energization of the storage plate magnets under the control of perforations in the card C and the subsequent operation of the reading bar magnets under the control of the emitter 280.

A similar timing change must be made in respect to the column by column keyboard entry system, and this change is effected by shifting the operating lever 282 of a gang switch controlling the circuits established by depression of the keyboard bails. Spacing of the bail contact points 232a, 233a, 235a and 232b, 233b and 235b, respectively, is such with reference to the spacing of contact points 220, 220a, 220b and 222, 222a and 222b, respectively, that contact is made between the bail contacts, thereby establishing the bail circuits before contact is made between the key contacts which are effective to establish the key circuits. This results in energizing the storage plate magnets prior to the energization of the reading bar magnets.

Since the entry of data from the card C and from the keyboard structure is substantially the same as for column by column readout, excepting for the circuit inversion as noted above, only one entry from the card and one entry from the keyboard will be traced.

With the readout switch 236 and the emitter switch 204 open, with the gang switches 276 and 282 shifted to their dotted line position, and with the emitter switch 278 closed, the entry of data will be as follows: As the brush 214 of the emitter 212 comes in contact with the 9 segment, a circuit will be established from the line 202 through the emitter, through the sensing brush 210 which extends through the card perforation at the 9 index point position of the hundreds column, through the connector 216, through the now closed switch contact 254b and to the 9 storage plate magnet. This will effectively displace the storage wires in the 9 storage plate for latching by reciprocation of the reading bar under the influence of the emitter 280. As the brush 281 of the emitter 280 comes in contact with the 9 segment, a circuit will be established from the line, through the now closed emitter switch 278, the brush 281, the 9 contact segment, the now closed switch contact 267b and the 9 readout bar magnet. This will result in reciprocation of the 9 readout bar and the latching of the 9 storage wire thereby.

Depression of the 8 key of the hundreds bank of the keyboard will first close contacts 232a and 232b, whereby a circuit is established from the line through the now closed contact points of the bail switch and now closed switch contact point 234b. The impulse will be transmitted through the plug wire, through the now closed switch point 268b and to the circuit controlling the 5 storage plate magnet, thereby positioning the storage wires therein for latching upon subsequent operation of the associated reading bar. The 8 reading bar is operated upon the subsequent closure of the 8 key of the hundreds bank of the keyboard, thereby establishing a circuit from the line through common conductor 264, the key contacts, now closed switch contact 266b and the circuit controlling the 8 reading bar magnet. This will result in the reciprocation of the 8 reading bar and the latching of the wire associated therewith which is held in latching position by the previously operated 5 storage plate magnet.

The entry procedure just described will result in all designated index point positions of a source column being stored in a single storage plate. All digits of the same value will now be stored along the length of the reading bars as viewed in the diagram, so that reciprocation of a reading bar will readout all digits of a kind, i. e. concurrently. Such readout conditions are required for certain recording operations such as those involved in the control of the type bars of a tabulating machine in connection with which the readout operation may be explained.

For concurrent readout there has been provided an emitter 282, which is driven synchronously with the tabulating machine. The emitter is similar in character to the entry emitters, and consists generally of a plurality of contact segments which are successively bridged by a rotating brush 284, which is driven from the tabulating machine mechanism. In order to accomplish concurrent readout, the switch 242 is opened and a readout emitter switch 286 is closed. The punch magnet switch 252 is opened and a printing magnet switch 288 is closed. The readout switch 236 is likewise closed. Rotation of the emitter brush 284 will first make contact with the 9 segment which will close a circuit from the line through the switch 286, through the brush 284, the 9 segment and the circuit controlling the 9 readout bar magnet. When the 9 readout bar magnet is energized, the 9 readout bar will be reciprocated so that the projection 9b thereof will contact the latched 9 wire. This will establish a circuit from the line, through the now closed readout switch 236, the 9 readout bar, the latched 9 wire to the print magnet 290, which controls a type bar for positioning the same with the character 9 in printing position in well known manner. As the brush 284 comes into contact with the 8 segment of the emitter 280, a circuit will be established from the line, through the now closed switch 286, the brush 284, the 8 segment, the circuit controlling the 8 readout magnet, thereby reciprocating the 8 readout bar so that the projection 8b thereon will contact the stored 8 wire. This will establish a circuit from the line through the now closed readout switch 236, the 8 readout bar, the stored 8 wire and the type bar control magnet which is effective to align the character 8 in printing position.

The columnar relation of the stored data with respect to their columnar position in a punching mechanism, a tabulating machine or any other mechanism adapted to be controlled thereby may be controlled by appropriate cross-plugging in a well known manner.

The wires that have been latched for data storage purposes in the storage device will remain in latched position for repeated readout operation until a reset switch 292 is closed, followed by a revolution of the emitter 280. Closure of the switch 292 will result in operation of the reset magnet 36, and subsequent emitter operation will sequentially energize the storage plate magnets to release wires that may have been latched. To selectively reset the latched wires, selective reset switches 300 through 309 have been provided. The selective reset switches 300 through 309 are normally closed, and when in closed position, closure of the reset switch 292 and resultant energization of the reset magnet 36 will sequentially operate all the storage plate magnets, but should any one of the selective reset switches 300 through 309 be opened, its related storage plate magnet will be unaffected by energization of the reset magnet 36. Consequently, if it is desired to retain the stored information in one or more of the storage plates, it is merely necessary to open the selective reset switch associated with that plate, and thereafter energization of the reset magnet 36 will effectively restore the storage wires in all storage plates for which the selective reset switches remain closed.

While the switches 300 to 309 are represented as manually operated switches, they may instead be contacts of selector relays, such as the relays R30, 31 in Patent No. 2,340,772.

Having described the invention in its presently preferred embodiment, what we claim is:

1. A storage device comprising a plurality of data storage zones each consisting of a plurality of spaced storage elements in substantial alignment with corresponding elements of an adjacent zone, means for initially simultaneously displacing the elements of a given zone into a position from which they may be latched, means thereafter operative to latch selected displaced elements in displaced position, said last named means being thereafter operative to read out latched storage elements by contact therewith in their latched position, and means including said readout means for impressing a current on a storage element when in readout contact with said readout means.

2. A storage device comprising a plurality of data storage zones each consisting of a plurality of spaced storage elements aligned in rows with corresponding elements of an adjacent zone, means for initially simultaneously displacing the elements of a given zone into a position from which they may be latched, separate means associated with each row or aligned elements thereafter operative to latch selected displaced elements in displaced position, means for sequentially operating said last named means to read out latched storage elements by contact therewith in their latched position, and means including said readout means for impressing a current on a storage element when in readout contact with said readout means.

3. A storage device comprising a plurality of data storage zones each consisting of a plurality of spaced storage elements in substantial alignment with corresponding elements of an adjacent zone, current responsive means for initially simultaneously displacing the elements of a given zone into a position from which they may be latched, current responsive means thereafter operative to latch selected displaced elements in displaced position, said last named current responsive means being thereafter operative to read out latched storage elements by contact therewith in their latched position, and means including said readout means for impressing a current on a storage element when in readout contact with said readout means.

4. A storage device comprising a plurality of data storage zones each consisting of a plurality of spaced storage wires in substantial alignment with corresponding wires of an adjacent zone, current responsive means for initially simultaneously displacing the wires of a given zone into a position from which they may be latched, current responsive means thereafter operative to latch selected displaced wires in displaced position, said last named current responsive means being thereafter operative to read out latched storage wires by contact therewith in their latched position, and means including said readout means for impressing a current on a storage wire when in readout contact with said readout means.

5. A storage device comprising a plurality of data storage zones each consisting of a plurality of spaced storage wires in substantial alignment with corresponding wires of an adjacent zone, electromagnetically operated means for initially simultaneously displacing the wires of a given zone into a position from which they may be latched, a bar traversing said storage zones adjacent each set of aligned wires thereof and having means thereon for engaging displaced wires of each zone, electromagnetic means associated with each bar for selectively reciprocating said bars subsequent to the operation of said first named electromagnetic means to latch selected displaced storage wires in displaced position, means for electrically energizing said bars, and means for thereafter sequentially energizing the electromagnetic devices controlling said bars for reciprocating the wire engaging means thereon into readout contact with wires latched in displaced position, whereby values of which such wires are representative may be read from said device.

6. A storage device comprising a plurality of data storage zones each consisting of a plurality of spaced storage elements in substantial alignment with corresponding elements of an adjacent zone, first current responsive means for initially simultaneously displacing the elements of a given zone into a position from which they may be latched, second current responsive means thereafter operative to latch selected displaced storage elements in displaced position, a first and second impulse originating device adapted to transmit electric impulses at spaced intervals, and means for electrically connecting either of said current responsive means with either of said impulse originating devices, said second current responsive means being thereafter operative to read out latched storage elements by contact therewith in their latched position.

7. A storage device comprising a plurality of data storage zones each consisting of a plurality of spaced storage elements in substantial alignment with corresponding elements of an adjacent zone, first current responsive means for initially simultaneously displacing the elements of a given zone into a position from which they may be latched, second current responsive means thereafter operative to latch selected displaced storage elements in displaced position, a first and second impulse originating device adapted to transmit electric impulses at spaced intervals, means for electrically connecting either of said current responsive means with either of said impulse originating devices, said second current responsive means being thereafter operative to read out latched storage elements by contact therewith in their latched position, and means including said readout means for impressing a current on a storage element when in readout contact with said readout means.

8. A storage device comprising a plurality of data storage zones each consisting of a plurality of spaced storage wires in substantial alignment with corresponding wires of an adjacent zone, first current responsive means for initially simultaneously displacing the wires of a given zone into a position from which they may be latched, second current responsive means thereafter operative to latch selected displaced storage wires in displaced position, a first and second impulse originating device adapted to transmit electric impulses at spaced intervals, and means for electrically connecting either of said current responsive means with either of said impulse originating devices, said second current responsive means being thereafter operative to read out latched storage wires by contact therewith in their latched position.

9. A storage device comprising a plurality of data storage zones each consisting of a plurality of spaced storage wires in substantial alignment with corresponding wires of an adjacent zone, first current responsive means for initially simultaneously displacing the wires of a given zone into a position from which they may be latched, second current responsive means thereafter operative to latch selected displaced storage wires in displaced position, a first and second impulse originating device adapted to transmit electric impulses at spaced intervals, means for electrically connecting either of said current responsive means with either of said impulse originating devices, said second current responsive means being thereafter operative to read out latched storage wires by contact therewithin their latched position, and means including said readout means for impressing a current on a storage wire when in readout contact with said readout means.

10. A storage device comprising a plurality of data storage zones each consisting of a plurality of spaced storage elements in substantial alignment with corresponding elements of an adjacent zone, first current responsive means for initially simultaneously displacing the elements of a given zone into a position from which they may be latched, second current responsive means thereafter operative to latch selected displaced storage elements in displaced position, a first and second impulse originating device adapted to transmit electric impulses at spaced intervals, means for electrically connecting either of said current responsive means with either of said impulse originating devices, and means including said second current responsive means for impressing a current on a storage element when in contact with said last named means.

11. A storage device comprising a plurality of data storage zones each consisting of a plurality of spaced storage elements aligned in rows with corresponding elements of an adjacent zone, first current responsive means for initially simultaneously displacing the elements of a given zone into a position from which they may be latched, separate second current responsive means associated with each row of aligned elements thereafter operative to latch selected displaced storage elements in displaced position, a first and second impulse originating device adapted to transmit electric impulses at spaced intervals, means for electrically connecting either of said current responsive means with either of said impulse originating devices, means for sequentially energizing said second current responsive means to move the same into reading contact with latched storage elements, and means including said reading means for impressing a current on a storage element when in reading contact with said reading means.

12. A storage device comprising a plurality of data storage zones each consisting of a plurality of spaced storage wires in substantial alignment with corresponding wires of an adjacent zone, first current responsive means for initially simultaneously displacing the wires of a given zone into a position from which they may be latched, second current responsive means thereafter operative to latch selected displaced storage wires in displaced position, a first and second impulse originating device adapted to transmit electric impulses at spaced intervals, means for electrically connecting either of said current responsive means with either of said impulse originating devices, and means including said second current responsive means for impressing a current on a storage wire when in contact with said last named means.

13. A storage device comprising a plurality of data storage zones each consisting of a plurality of spaced storage wires aligned in rows with corresponding wires of an adjacent zone, first current responsive means for initially simultaneously displacing the wires of a given zone into a position from which they may be latched, separate second current responsive means associated with each row of aligned elements thereafter operative to latch selected displaced storage wires in displaced position, a first and second impulse originating device adapted to transmit electric impulses at spaced intervals, means for electrically connecting either of said current responsive means with either of said impulse originating devices, means for sequentially energizing said second current responsive means to move the same into reading contact with latched storage wire, and means including said second current responsive means for impressing a current on a storage wire when in reading contact with said last named means.

14. A storage device comprising a plurality of data storage zones, each consisting of a plurality of spaced storage elements aligned in rows with corresponding elements of an adjacent zone, means for initially simultaneously displacing the elements of a given zone into a position from which they may be latched, separate means associated with each row of aligned elements thereafter operative to latch selected displaced elements in displaced position, means for sequentially operating said last named means to read out latched storage elements by contact therewith in their latched position, means including said readout means for impressing a current on a storage element when in readout contact with said readout means, and means for selectively releasing latched storage elements.

15. A storage device comprising a plurality of data storage zones, each consisting of a plurality of spaced storage elements aligned in rows with corresponding elements of an adjacent zone, means for initially simultaneously displacing the elements of a given zone into a position from which they may be latched, separate means associated with each row of aligned elements thereafter operative to latch selected displaced elements in displaced position, means for sequentially operating said last named means to read out latched storage elements by contact therewith in their latched position, means including said readout means for impressing a current on a storage element when in readout contact with said readout means, common reset means for releasing latched storage elements, and means for rendering said common means ineffective to release latched storage elements in selected zones.

CLAIR D. LAKE.
WESLEY PFAFF.
DONALD R. PIATT.

REFERENCES CITED

The following references are of record in the file of this patent:

UNITED STATES PATENTS

| Number | Name | Date |
|---|---|---|
| 1,876,296 | Hofgaard | Sept. 6, 1932 |
| 2,113,215 | Magrath | Apr. 5, 1938 |
| 2,358,095 | Parker | Sept. 12, 1944 |
| 2,369,430 | Brand et al. | Feb. 13, 1945 |
| 2,405,287 | Brand et al. | Aug. 6, 1946 |
| 2,473,466 | Bitner | June 14, 1949 |